US008656137B2

(12) United States Patent
Koob et al.

(10) Patent No.: US 8,656,137 B2
(45) Date of Patent: Feb. 18, 2014

(54) COMPUTER SYSTEM WITH PROCESSOR LOCAL COHERENCY FOR VIRTUALIZED INPUT/OUTPUT

(75) Inventors: Christopher Edward Koob, Round Rock, TX (US); Lucian Codrescu, Austin, TX (US); Erich James Plondke, Austin, TX (US); Bryan C. Bayerdorffer, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/223,347

(22) Filed: Sep. 1, 2011

(65) Prior Publication Data

US 2013/0061020 A1 Mar. 7, 2013

(51) Int. Cl.
*G06F 12/08* (2006.01)
(52) U.S. Cl.
USPC .................. 711/206; 711/6; 711/202
(58) Field of Classification Search
None
See application file for complete search history.

(56) References Cited

U.S. PATENT DOCUMENTS

| 6,631,447 B1 | 10/2003 | Morioka et al. | |
| 2006/0206658 A1* | 9/2006 | Hendel et al. | 711/6 |
| 2007/0162641 A1 | 7/2007 | Oztaskin et al. | |
| 2007/0214339 A1* | 9/2007 | Wooten | 711/202 |
| 2009/0037614 A1 | 2/2009 | Saripalli | |
| 2010/0011167 A1 | 1/2010 | Hady et al. | |
| 2010/0023724 A1* | 1/2010 | Bhandari et al. | 711/171 |
| 2010/0217937 A1 | 8/2010 | Symes et al. | |
| 2011/0099319 A1* | 4/2011 | Mukherjee et al. | 711/6 |
| 2012/0117301 A1* | 5/2012 | Wingard | 711/6 |
| 2012/0198140 A1* | 8/2012 | Karamcheti et al. | 711/103 |
| 2012/0331250 A1* | 12/2012 | Nelson | 711/162 |
| 2013/0031332 A1* | 1/2013 | Bryant et al. | 711/207 |

OTHER PUBLICATIONS

Leonid Ryzhyk, "Shared Memory Multiprocessors," leonidr@cse.unsw.edu.au, Apr. 21, 2006, pp. 1-15.
International Search Report and Written Opinion—PCT/US2012/053682—ISA/EPO—Feb. 5, 2013.

* cited by examiner

*Primary Examiner* — Than Nguyen
(74) *Attorney, Agent, or Firm* — Peter Michael Kamarchik; Nicholas J. Pauley; Joseph Agusta

(57) ABSTRACT

A method includes selectively routing a physical address to an originating device instead of to a shared memory at controller that manages conversion of device virtual addresses to physical addresses. The physical address corresponds to a data access from a virtual device. The method may provide local coherency at a computing system that implements virtualized input/output.

23 Claims, 3 Drawing Sheets

COMPUTER SYSTEM WITH PROCESSOR LOCAL COHERENCY FOR VIRTUALIZED INPUT/OUTPUT

I. FIELD

The present disclosure is generally related to processor local coherency for virtualized input/output.

II. DESCRIPTION OF RELATED ART

A multiprocessor computer system may include multiple processors that have access to one or more input/output (I/O) devices. Some systems may support I/O virtualization. For example, virtualizing a single I/O device at a dual processor system may make the single I/O device appear as two independent I/O devices, where each processor "owns" one of the two independent I/O devices. Virtualization may facilitate sharing of I/O devices by the multiple processors. Typically, virtualized systems may be kept fully coherent. That is, each processor in the multiprocessor system may track all I/O operations between the virtual I/O devices and a shared memory.

Full coherency may be implemented via hardware or software. However, scalability problems may occur in fully coherent systems as the number of virtual I/O devices and the number of processors increases. For example, increasing the number of processors may increase the complexity associated with the coherent virtualized I/O device, since each of the processors is aware of each read and write operation of the virtualized I/O device performed by each of the other processors. This may involve additional data processing at each of the processors and may further consume shared resources (e.g., a bus between the processors and a shared memory).

III. SUMMARY

In a virtualized system, virtual I/O devices may operate based on a virtual address space, whereas a shared memory (e.g., random access memory (RAM)) may support addressing based on a physical address space. In such systems, a controller (e.g., an I/O memory management unit (MMU) controller) may be coupled to the virtual I/O devices, to the processors (which may also be virtualized into virtual processors), and to the shared memory. The controller may convert between virtual addresses and physical addresses. In a fully coherent system, when a processor (e.g., an "originating" processor) associated with a virtual I/O device makes a data access request, the controller may route the corresponding data access (e.g., a direct memory access (DMA) write operation initiated by the virtual device) to the shared memory. To maintain full coherency, all processors, including the originating processor, may update their individual caches to reflect the write operation. However, in a virtualized system, the data written to the shared memory by a particular virtual device may only ever be accessed by the corresponding processor or virtual processor (i.e., the processor that originated the data access request). Thus, maintaining full coherency between such data and all other processors in the system may not be useful.

In accordance with the disclosed systems and methods, processor local coherency for virtualized I/O may be implemented. For example, a controller may selectively redirect physical addresses, and data associated therewith, to an originating (e.g., requesting) processor instead of to a shared memory. The originating processor may cache the data and may subsequently store the data in the shared memory, while other processors in the system may not be affected. In a system that includes N virtual I/O devices corresponding to N processors (where N is an integer greater than one), each processor may be coherent with respect to its corresponding virtual I/O device but may not be coherent with respect to any other processor or virtual I/O device.

In a particular embodiment, a method includes selectively routing a physical address to an originating device instead of to a shared memory at a controller that manages conversion of device virtual addresses to physical addresses. The physical address corresponds to a data access from a virtual device.

In another particular embodiment, a system includes a virtualized device, a plurality of devices having access to the virtualized device, a memory shared by each of the plurality of processors, and a controller coupled to the virtualized device and to each of the plurality of devices. The controller is configured to selectively redirect a physical address (and data) corresponding to a data access from the virtualized device to one of the plurality of devices instead of to the memory.

In another particular embodiment, an apparatus includes a controller. The controller includes means for managing conversion of device virtual addresses to physical addresses and means for selectively routing a physical address corresponding to a data access from a virtual device to an originating device instead of to a shared memory.

In another particular embodiment, an apparatus includes a controller. The controller includes a memory storing virtual addresses and physical addresses. The controller also includes a redirection unit configured to selectively route a physical address corresponding to a data access from a virtual device to an originating device instead of to a shared memory.

In another particular embodiment, a tangible processor-readable medium includes instructions executable by a processor at a controller that controls access to a virtual device. The instructions cause the processor to monitor a bus for access requests that are sent to the virtualized device from an originating device and to selectively redirect data (i.e., data responsive to the access requests) from the virtual device to the originating device instead of to a shared memory.

One particular advantage provided by at least one of the disclosed embodiments is improved data throughput and reduced power consumption at a system including one or more virtualized devices and multiple processors due to replacement of system-wide hardware coherency with device-specific (e.g., processor-specific) coherency.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

A partially coherent (e.g., processor local coherent) virtualized input/output (I/O) system may route data corresponding to a data access from a virtual device to a corresponding originating device (e.g., processor) instead of to a memory. For example, when a processor requests data from a corresponding virtual device, an MMU controller may route an associated physical address and the requested data from the virtual device to the requesting processor instead of to a shared memory. Other processors in the system may be unaware of the routing. The non-coherency of the other processors may be acceptable or advantageous under certain conditions, since for example the other processors may not have or need access to the requested data.

Figure 1:
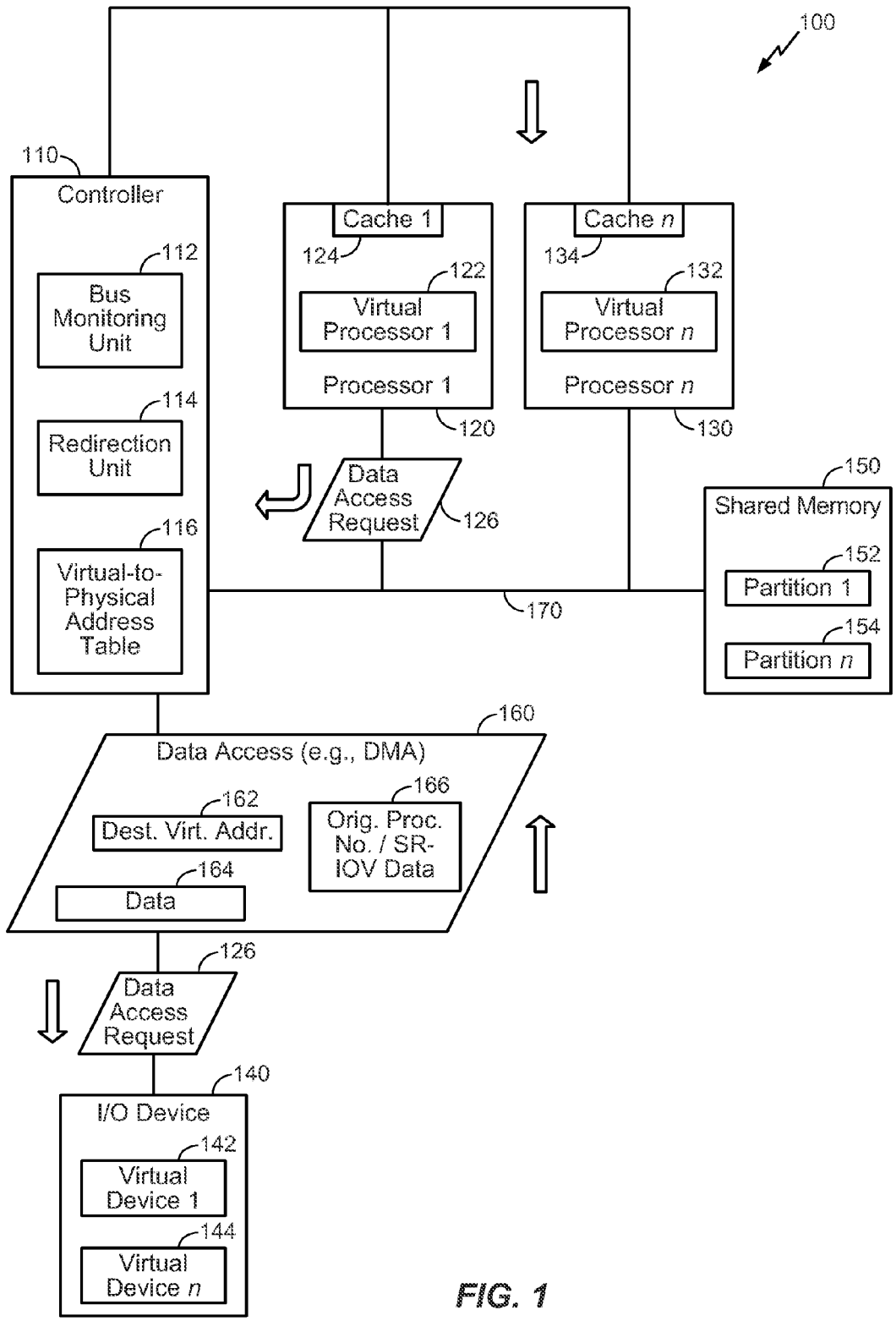
FIG. 1 is a diagram of a particular illustrative embodiment of a system that is operable to route data corresponding to a data access from a virtual device to an originating device instead of to a shared memory.

FIG. 1 is a diagram of a particular illustrative embodiment of a system 100 operable to selectively route data corresponding to a data access from a virtual device to an originating device (e.g., originating processor or other device) instead of to a shared memory. The system 100 includes a controller 110 communicatively coupled to an I/O device 140, a shared memory 150, and a plurality of processors (e.g., illustrative processors 120, 130). In a particular embodiment, the controller 110 may be an input/output (I/O) memory management unit (MMU) controller. Alternately, the controller may be another type of controller. Coupling between the controller 110, the processors 120 and 130, the I/O device 140, and the shared memory 150 may be implemented in a computer system via one or more hardware buses 170 and communication circuitry. In a particular embodiment, the shared memory 150 may be a random access memory (RAM).

It should be noted that although the particular embodiment of FIG. 1 illustrates a dual processor system, more than two or less than two processors may be present in the system 100. For example, the system 100 may be included within a computing device such as a computer server and the computing device may include more than two processors or may be a single-processor server or device that supports virtualization.

The processors 120 and 130 may support virtualization. For example, each of the processors 120 and 130 may include a cache 124 and 134 and may support one or more virtual processors, such as the illustrated virtual processors 122 and 132. In a particular embodiment, each virtual processor 122, 132 may correspond to a particular operating system being executed at the underlying processor 120, 130. The I/O device 140 may also support virtualization. For example, when there are "n" processors 120, 130 in the system 100, the I/O device 140 may support "n" corresponding virtual devices 142, 144 (in the example illustrated in FIG. 1, "n" is equal to two). In a particular embodiment, each virtual device 142, 144 may be accessible via commands in accordance with an I/O virtualization protocol. For example, the virtual devices 142, 144 may be accessible via commands conforming to a single root I/O virtualization (SR-IOV) protocol at a computer system having a peripheral component interconnect express (PCIe) hardware topology (e.g., a computer system with a PCIe bus). The virtual devices 142, 144 may perform data read and/or data write operations (e.g., direct memory access (DMA) operations) under control of the processors 120, 130.

The controller 110 may control access to the virtual devices 142, 144 and may manage conversion of virtual addresses to physical addresses, and vice versa. In a particular embodiment, the controller 110 may include a bus monitoring unit 112, a redirection unit 114, and a virtual-to-physical address table 116. The bus monitoring unit 112, the redirection unit 114, and the virtual-to-physical address table 116 may be implemented using dedicated hardware and memory, using instructions executable by the controller 110 or a processor therein, or any combination thereof.

The bus monitoring unit 112 may monitor the bus 170 for data access requests sent to the virtualized devices 142, 144 from any of the processors 120, 130 and/or the virtual processors 122, 132. For example, the bus monitoring unit 112 may detect a data access request 126 sent by the first processor 120 to the corresponding first virtual device 142. Data access requests may be requests for data reads, data writes, or any combination thereof.

The redirection unit 114 may be operable to selectively redirect physical addresses and data to the processors 120, 130 instead of to the shared memory 150. For example, when the controller 110 receives a data access 160 from the I/O device 140 in response to the data access request 126 sent by the first processor 120, the data access 160 may specify a destination virtual address 162 and may include data 164 (e.g., data to be written to the destination virtual address 162). The redirection unit 114 may access the virtual-to-physical address table 116 to map the destination virtual address 162 to a corresponding destination physical address in the shared memory 150. In a particular embodiment, the shared memory 150 may be divided into "n" partitions 152, 154 corresponding to the "n" virtual devices 142, 144 and to the "n" processors 120, 130. In such an embodiment, the destination physical address corresponding to the destination virtual address 162 may be located in the partition corresponding to the first processor 120 (e.g., the first partition 152).

The redirection unit 114 may also identify the originating processor 120 to which the determined destination physical address is to be routed. The originating processor 120 may be identified in accordance with various methods. To illustrate, in a particular embodiment, the data access 160 may include an originating processor number or SR-IOV data (e.g., SR-IOV data stored in one or more data fields in accordance with an SR-IOV standard) 166, and the redirection unit 114 may identify the originating processor 120 based on such information. In another particular embodiment, the system 100 may support an extended address space. For example, the virtual address 162 and/or the physical address may be an extended address, and the originating processor 120 may be identified based on at least one bit of the extended address. In a system including "$2^B$" processors, "B" bits of the extended address may be used to identify the originating processor. Upon identifying the originating processor 120, the redirection unit 114 may route the destination physical address and the data 164 to the originating processor 120 instead of to the shared memory 150. In a particular embodiment, the data 164 may correspond to a direct memory access (DMA) read operation by the corresponding virtual device, where the corresponding processor (or virtual processor) may retrieve the data from system memory if the data is not in the corresponding local cache. For example, the data 164 may be selectively routed to and directly consumed by the corresponding processor instead of being written to shared memory because the data may be specific to the corresponding processor (i.e., not accessed by other processors). When data is specific to a particular processor, the data may be selectively routed to the particular processor instead of to the shared memory, thereby reducing congestion on the bus 170. In an alternate embodiment, the destination physical address and the data 164 may be routed to the originating processor 120 via the bus 170, instead of via a separate connection as illustrated in FIG. 1.

During operation, the bus monitoring unit 112 may detect data access requests from one or more of the processors 120, 130. For example, the bus monitoring unit 112 may detect the data access request 126 from the first processor 120 to the first virtual device 142, where the data access request 126 corresponds to retrieving data from the I/O device 140. In response to the data access request 126, the virtual device 142 may issue the data access 160 including the destination virtual address 162 and the data 164 to be written to the destination virtual address 162. The redirection unit 114 at the controller 110 may convert the destination virtual address 162 to the corresponding destination physical address based on the virtual-to-physical address table 116, and may route the destination physical address and the data 164 to the originating processor 120 instead of to the shared memory 150.

The processor 120 may store the data 164 in the cache 124 at a location based on the physical address. Thus, the virtual device 142 and the data access 160 may be coherent with respect to the cache 124. However, the cache 124 may be non-coherent with respect to the shared memory 150 and with respect to other caches associated with other processors (e.g., the second cache 134 associated with the second processor 130). In a particular embodiment, the originating processor 120 may assume the responsibility of forwarding the data 164 to the shared memory 150. For example, after the data 164 is stored in the cache 124, the originating processor 120 may route the data 164 (or a copy of the data 164) to a location in the first partition 152 corresponding to the destination physical address. In a particular embodiment, when the system 100 enables process migration from the processor 120 to the processor 130, the processor 120 may forward the data 164 to the shared memory 150 so that the processor 130 can access the data 164.

In a particular embodiment, the system 100 of FIG. 1 may support software-implemented coherency for particular events. For example, the system 100 of FIG. 1 may support software-implemented full coherency in the case of virtual device initialization, virtual device destruction, and process migration (e.g., from one processor to another processor).

The system 100 of FIG. 1 may thus replace system-wide full coherency with partial coherency. For example, each processor-device pair in the system 100 may be coherent. However, each processor-device pair may not be coherent with respect to other processor-device pairs, as in a fully hardware coherent system. The system 100 of FIG. 1 may thus decrease hardware complexity and reduce congestion on the bus 170. By replacing system-wide full coherency with partial coherency, the system 100 of FIG. 1 may also achieve reduced power consumption and may be built or operated at a lower cost than fully coherent systems.

Figure 2:
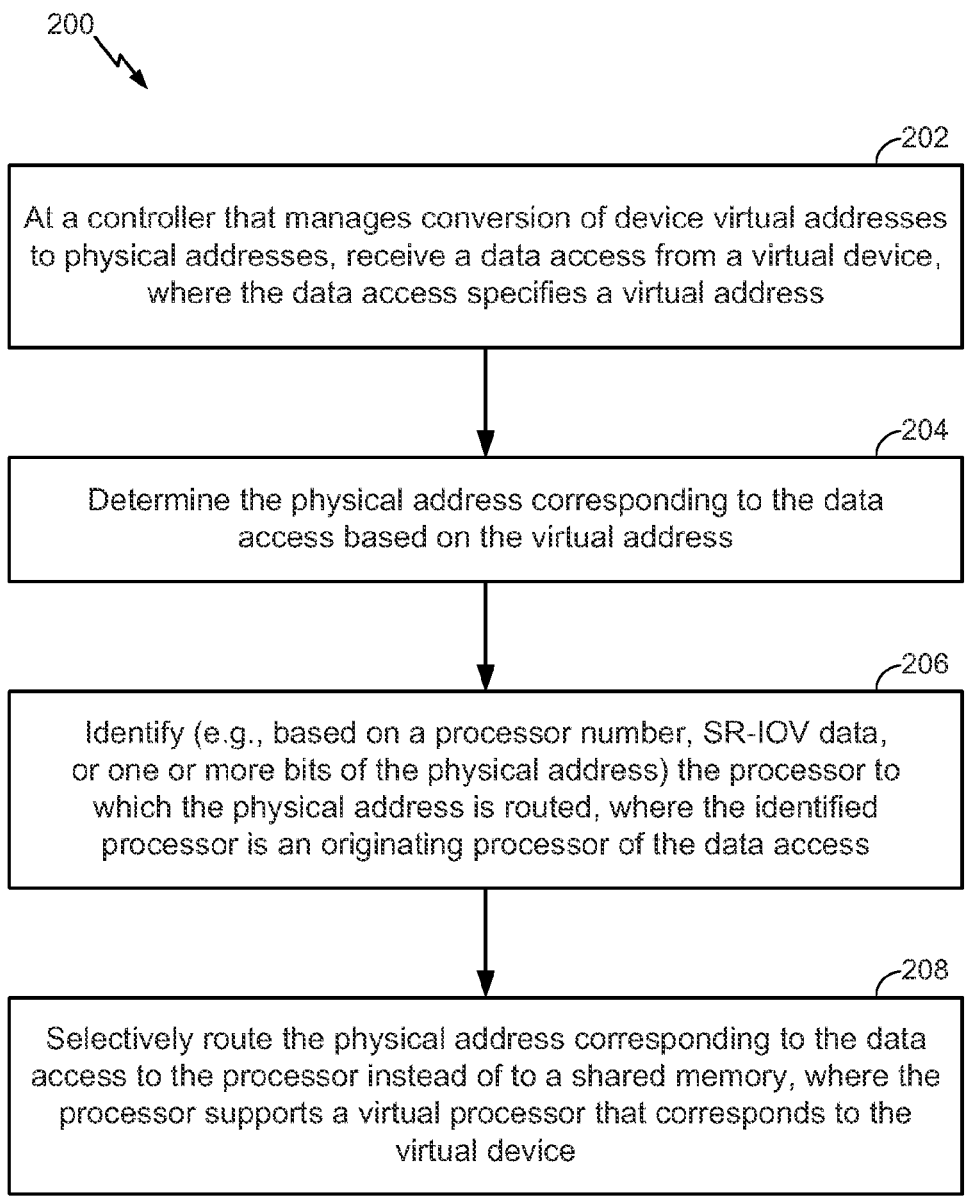
FIG. 2 is a flow chart of a particular illustrative embodiment of a method of routing data from a virtual device to an originating device instead of to a shared memory.

FIG. 2 is a flow chart of a particular illustrative embodiment of a method 200 of routing data to a processor instead of to a shared memory. In an illustrative embodiment, the method 200 may be performed by the controller 110 of FIG. 1.

The method 200 may include, at a controller that manages conversion of device virtual addresses to physical addresses, receiving a data access from a virtual device, at 202. The data access may specify a virtual address. For example, in FIG. 1, the controller 110 may receive the data access 160 from the first virtual device 142, where the data access 160 specifies the destination virtual address 162.

The method 200 may also include determining the physical address corresponding to the data access based on the virtual address, at 204. For example, in FIG. 1, the redirection unit 114 may determine the destination physical address from the destination virtual address 162 based on the virtual-to-physical address table 116.

The method 200 may further include identifying the processor to which the physical address is routed, at 206. The identified processor may be an originating processor of the data access. In a particular embodiment, the originating processor may be identified based on a processor number, SR-IOV data, or one or more bits of the physical address. For example, in FIG. 1, the redirection unit 114 may identify the first processor 120 as the originating processor based on the originating processor number/SR-IOV data 166 or based on one or more bits of the destination physical address.

The method 200 may include selectively routing the physical address corresponding to the data access to the processor instead of to a shared memory, at 208. The processor may support a virtual processor that corresponds to the virtual device. For example, in FIG. 1, the redirection unit 114 may route the destination physical address and the corresponding data 164 to the originating processor 120 instead of to the shared memory 150, where the originating processor 120 supports the first virtual processor 122 that corresponds to the first virtual device 142. In a particular embodiment, the originating processor 120 may store the data 164 in the cache 124 at a location determined based on the physical address and may subsequently forward the data to the first partition 152 of the shared memory 150. In a particular embodiment, after the data 164 is stored in the shared memory 150, the data 164 may be accessible by processors other than the originating processor 120 (e.g., the second processor 130).

Figure 3:
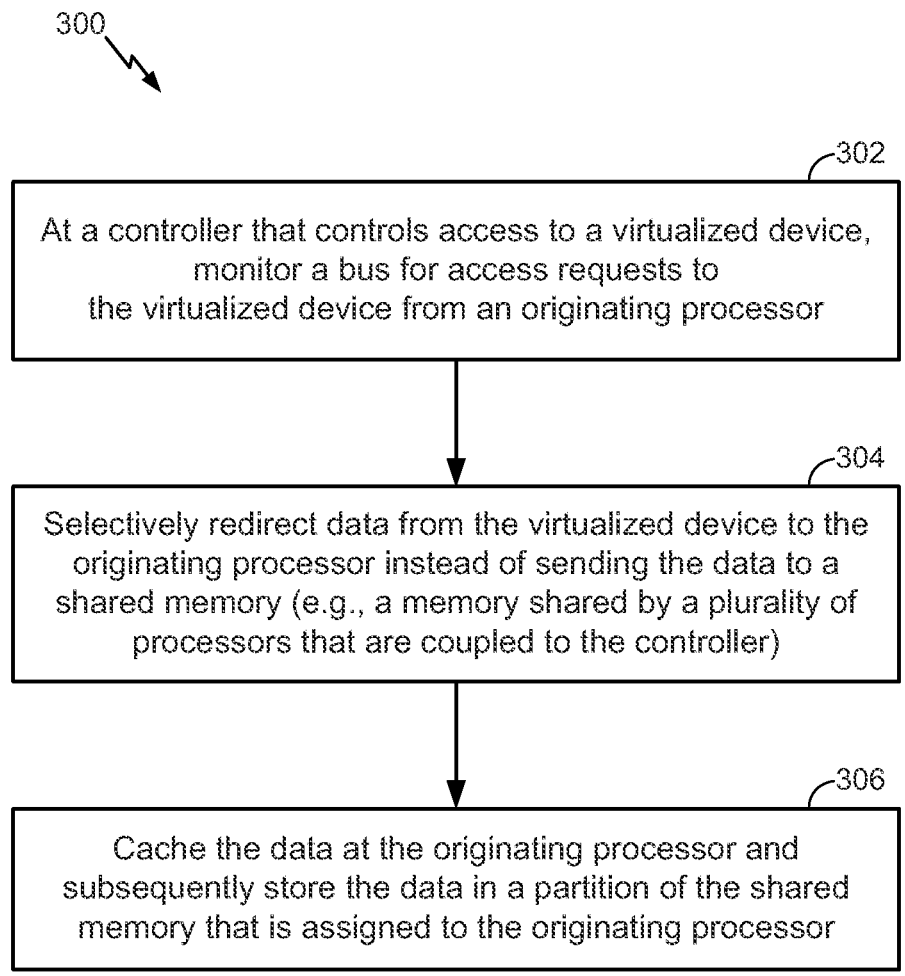
FIG. 3 is a flow chart of another particular illustrative embodiment of a method of routing data from a virtual device to an originating device instead of to a shared memory.

FIG. 3 is a flow chart of another particular illustrative embodiment of a method 300 of routing data from a virtualized device. In an illustrative embodiment, the method 300 may be performed by the controller 110 of FIG. 1.

The method 300 may include, at a controller that controls access to a virtualized device, monitoring a bus for access requests to the virtualized device from an originating processor, at 302. For example, in FIG. 1, the bus monitoring unit 112 of the controller 110 may monitor the bus 170 for access requests, such as the data access request 126. In response to detecting the data access request 126 from the originating processor 120 to the I/O device 140, the controller 110 may begin monitoring communications of the I/O device 140 for a response to the data access request 126 (e.g., the data access 160).

The method 300 may also include selectively redirecting data from the virtualized device to the originating processor instead of sending the data to a shared memory, at 304. In an illustrative embodiment, the shared memory may be shared by a plurality of processors that are coupled to the controller. For example, in FIG. 1, the redirecting unit 114 of the controller 110 may selectively redirect the data 164 to the originating processor 120 instead of to the shared memory 150. In a particular embodiment, the method 300 may further include caching the data routed by the controller at the originating processor and subsequently storing the data in a partition of the shared memory that is assigned to the originating processor, at 306. For example, in FIG. 1, the originating processor 120 may store the data 164 in the cache 124 and may subsequently send the data 164 for storage in the first partition 152 of the shared memory 150 that is assigned to the originating processor 120.

The methods 200, 300 of FIGS. 2-3 may replace system-wide full coherency with multiple instances of partial coherency. For example, each processor-device pair (e.g., the first processor 120 and the first virtual device 142 of FIG. 1 and the second processor 130 and the second virtual device 144 of FIG. 1) may be internally coherent but may not be coherent with respect to other processor-device pairs, as in a fully coherent system. The methods 200, 300 of FIGS. 2-3 may thus achieve decreased hardware complexity, reduced bus congestion, and lower power consumption in a virtualized system (e.g., a computer server having virtualized devices in accordance with the SR-IOV standard).

In conjunction with the described embodiments, an apparatus is disclosed that includes a controller having means for managing conversion of device virtual addresses to physical addresses. For example, the means for managing conversion may include one or more of the controller 110 of FIG. 1, the redirecting unit 114 of FIG. 1, one or more other devices configured to manage conversion of device virtual addresses to physical addresses, or any combination thereof.

The controller may also include means for routing a physical address and data corresponding to a data access from a virtual device to a processor instead of to a shared memory. For example, the means for routing may include one or more of the controller 110 of FIG. 1, the redirection unit 114 of FIG. 1, one or more other devices configured to route physical addresses to a processor instead of to a shared memory, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
at a controller that manages conversion of device virtual addresses to physical addresses, selectively routing a physical address to a particular device, the physical address corresponding to a data access operation initiated by a virtual device, wherein the particular device comprises a first processor, and wherein the particular device is distinct from the virtual device.

2. The method of claim 1, further comprising determining the physical address based on a virtual address, wherein the data access operation specifies the virtual address.

3. The method of claim 1, wherein the first processor supports a virtual processor, wherein the virtual processor corresponds to the virtual device, and wherein the virtual device is accessible to the virtual processor by sending one or more commands from the virtual processor to the virtual device in accordance with an input/output (I/O) virtualization protocol.

4. The method of claim 3, wherein the controller comprises an input/output (I/O) memory management unit (MMU) controller and wherein the I/O virtualization protocol comprises a single root input/output virtualization (SR-IOV) protocol.

5. The method of claim 1, further comprising identifying the particular device prior to routing the physical address.

6. The method of claim 5, wherein the particular device is identified based on a processor number associated with the data access operation or based on single root input/output virtualization (SR-IOV) data associated with the data access.

7. The method of claim 1, further comprising identifying the particular device prior to routing the physical address, wherein the physical address is an extended address, and wherein the particular device is identified based on at least one bit of the extended address.

8. The method of claim 1, wherein the data access operation is a write operation, a read operation, or a combination thereof.

9. The method of claim 1, wherein the virtual device comprises a virtualized input/output device.

10. The method of claim 1, wherein the first processor includes a first cache memory, wherein the data access operation is coherent with respect to the first cache memory, wherein the first cache memory is non-coherent with respect to a second cache memory of a second processor that has access to a shared memory, and wherein the shared memory is shared by the first processor and the second processor.

11. The method of claim 1, wherein the first processor includes a cache memory, and wherein the first processor stores data in the cache memory at a first location determined based on the physical address.

12. The method of claim 11, wherein, after the data is stored in the cache memory, the first processor sends the data to a second location of a shared memory, wherein the second location corresponds to the physical address.

13. The method of claim 1, wherein the data access operation is a direct memory access (DMA) read operation initiated by the virtual device.

14. A system comprising:
a virtualized device;
a plurality of devices having access to the virtualized device;
a memory shared by each of the plurality of devices; and
a controller coupled to the virtualized device and to each of the plurality of devices, wherein the controller is configured to selectively redirect data to a particular device of the plurality of devices, wherein the data is specified by a data access operation initiated by the virtualized device, wherein the particular device comprises a processor, and wherein the particular device is distinct from the virtualized device.

15. The system of claim 14, wherein the controller comprises an input/output (I/O) memory management unit (MMU) controller, wherein the data access operation specifies a virtual address, wherein a physical address is determined based on the virtual address, wherein the physical address is associated with a first location in a shared memory, and wherein the data is selectively redirected to a second location associated with the particular device, the second location distinct from the first location.

16. An apparatus comprising:
a controller including:
means for managing conversion of device virtual addresses to physical addresses; and
means for selectively routing a physical address to a particular device, the physical address corresponding to a data access operation initiated by a virtual device, wherein the particular device comprises a processor, and wherein the particular device is distinct from the virtual device.

17. The apparatus of claim 16, wherein the processor is an originating processor of a data access request, wherein the data access operation is based on the data access request, and wherein the controller further includes means for identifying the originating processor.

18. An apparatus comprising:
a controller including:
a memory storing virtual addresses and physical addresses; and
a redirection unit configured to:
selectively route a physical address to a particular device, the physical address corresponding to a data access operation initiated by a virtual device, wherein the particular device comprises a processor, and wherein the particular device is distinct from the virtual device.

19. The apparatus of claim 18, wherein the memory stores an address table to manage conversion of the virtual addresses to the physical addresses, wherein the processor is an originating processor of a data access request, wherein the data access operation is based on the data access request received at the virtual device, and wherein the redirection unit is further configured to identify the originating processor.

20. A tangible processor-readable medium including instructions executable by a processor to cause the processor to:
monitor a bus for an access request that is sent to a virtual device from a particular device; and
selectively redirect data to the particular device, wherein the data is specified by a data access operation initiated by the virtual device, wherein the particular device comprises a particular processor, and wherein the particular device is distinct from the virtual device.

21. The processor-readable medium of claim 20, wherein the instructions are further executable by the processor to cause the processor to detect the access request from the particular device.

22. The method of claim 1, further comprising selectively routing the physical address to the particular device subsequent to receiving an indication of the data access operation at the controller, wherein the data access operation is based on a data access request sent to the virtual device from the particular device.

23. The method of claim 22, further comprising:
receiving, at the controller, a virtual address from the virtual device, wherein the virtual address is specified by the data access operation initiated by the virtual device; and
converting the virtual address to the physical address subsequent to receiving the virtual address.

* * * * *